United States Patent
Oyama et al.

(10) Patent No.: US 7,325,890 B2
(45) Date of Patent: Feb. 5, 2008

(54) GLOVE FITTING DEVICE

(75) Inventors: Jun Oyama, Kyoto (JP); Kazuhiko Unoda, Kyoto (JP); Hitoshi Kusunoki, Kyoto (JP)

(73) Assignee: Kikusui Seisakusho Ltd., Kyoto (JP)

( * ) Notice: Subject to any disclaimer, the term of this patent is extended or adjusted under 35 U.S.C. 154(b) by 408 days.

(21) Appl. No.: 10/952,723

(22) Filed: Sep. 30, 2004

(65) Prior Publication Data

US 2005/0269916 A1 Dec. 8, 2005

(30) Foreign Application Priority Data

Jun. 3, 2004 (JP) ............................. P2004-165774

(51) Int. Cl.
*A61G 11/00* (2006.01)

(52) U.S. Cl. ........................................................ 312/1

(58) Field of Classification Search .................... 312/1; 600/21, 22; 976/DIG. 361, DIG. 362, DIG. 363; 34/242

See application file for complete search history.

(56) References Cited

U.S. PATENT DOCUMENTS

| | | | | |
|---|---|---|---|---|
| 2,695,605 A | * | 11/1954 | Gibbon | 600/22 |
| 3,084,684 A | * | 4/1963 | Saunders | 312/1 |
| 3,475,808 A | * | 11/1969 | Woolsey | 29/402.08 |
| 3,907,389 A | * | 9/1975 | Cox et al. | 312/1 |
| 4,010,588 A | * | 3/1977 | Eisert | 52/204.593 |
| 4,747,601 A | * | 5/1988 | Glachet | 277/628 |
| 4,773,392 A | * | 9/1988 | Koch | 600/22 |
| 4,788,965 A | * | 12/1988 | Milani et al. | 600/22 |
| 5,090,782 A | * | 2/1992 | Glachet et al. | 312/1 |
| 5,316,733 A | * | 5/1994 | Rune et al. | 422/104 |
| 5,425,400 A | * | 6/1995 | Szatmary | 141/98 |
| 5,797,833 A | * | 8/1998 | Kobayashi et al. | 600/22 |
| 6,293,902 B1 | * | 9/2001 | Hundertmark et al. | 600/22 |

FOREIGN PATENT DOCUMENTS

| | | | |
|---|---|---|---|
| GB | 2102719 A | * | 2/1983 |
| JP | 2992529 | | 10/1999 |
| JP | 2000-193788 | | 7/2000 |

\* cited by examiner

*Primary Examiner*—Janet M. Wilkens
*Assistant Examiner*—Timothy M Ayres
(74) *Attorney, Agent, or Firm*—Westerman, Hattori, Daniels & Adrian, LLP.

(57) ABSTRACT

This invention provides a glove fitting device to be removably fitted to a hermetically closable cabinet for fitting a glove to the cabinet in a manner to allow the glove to be stretched into the cabinet, the glove fitting device including: a tubular container having opposite first and second open ends, the first open end being configured to allow the glove to be replaceably fitted thereto; a lid-shaped member to be removably fitted to the second open end of the tubular container from inside of the tubular container to close the opening of the second open end substantially hermetically, the second open end becoming oriented inwardly of the cabinet when the tubular container is fitted to the cabinet; and a fixing mechanism for fixing the lid-shaped member to the second open end.

18 Claims, 12 Drawing Sheets

GLOVE FITTING DEVICE

BACKGROUND OF THE INVENTION

1. Field of the Invention

The present invention relates to a glove fitting device for fitting a glove to a cabinet defining a space completely isolated from indoor atmosphere, which is so-called "glove box".

2. Description of the Related Art

Conventionally, the general type of glove box for use in handling, for example, radioactive substances in nuclear energy facilities is configured to allow a glove to be fitted removably and directly into an opening defined by a cabinet. Another known type of glove box is such that a glove is fitted to a tubular inner ring body, which in turn is removably fitted to a cabinet, as described in Japanese Patent Laid-Open Publication No. 2000-193788.

According to the art described in this publication, replacement of the glove is achieved as follows. A substitute inner ring body fitted with a new glove is pressed against the inner ring body fitted to the cabinet to force the inner ring body fitted with a used glove into the cabinet, so that the substitute inner ring fitted with the new glove becomes fitted to the cabinet.

With this arrangement, when the substitute inner ring body fitted with the new glove becomes fitted to the cabinet, the inner ring body fitted with the used glove is forced into the cabinet together with the used glove. That is, the glove that will not be used any longer remains together with the inner ring body within the cabinet and, hence, the glove and the inner ring body that become useless upon the glove replacement cannot be recovered unless the cabinet is opened.

Usually, gloves for use in such a glove box often have a length corresponding to the forearm. Since such a glove is relatively long, it is possible that the glove dangles from the inner ring body, even though the glove is configured to be capable of being removed from the cabinet as fitted to the aforementioned tubular inner ring body. For this reason, when an operation is performed such as to transport the inner ring body fitted with such a glove or fit the inner ring body to the cabinet, the glove sometimes hinders such an operation.

SUMMARY OF THE INVENTION

Accordingly, an object of the present invention is to provide a glove fitting device enabling transport and fitting/removal of a glove in a state contained in a container.

According to the present invention, there is provided a glove fitting device to be removably fitted to a hermetically closable cabinet for fitting a glove to the cabinet in a manner to allow the glove to be stretched into the cabinet, the glove fitting device including: a tubular container having opposite first and second open ends, the first open end being configured to allow the glove to be replaceably fitted thereto; a lid-shaped member to be removably fitted to the second open end of the tubular container from inside of the tubular container to close the opening of the second open end substantially hermetically, the second open end becoming oriented inwardly of the cabinet when the tubular container is fitted to the cabinet; and a fixing mechanism for fixing the lid-shaped member to the second open end.

With this arrangement, the lid-shaped member fitted and fixed to the second open end of the tubular container by the fixing mechanism prevents the glove from coming out of the tubular container through the opening of the second open end. Therefore, the glove will not hinder the operation for removing the tubular container from the cabinet and, hence, smooth removal of the tubular container is possible. Moreover, in transporting the tubular container to a predetermined replacement site for replacement of glove, the glove in a state contained in the tubular container with its second open end hermetically closed allows the transporting operation to proceed safely without the glove contacting any matter existing therearound even if a substance that affects the environment adheres to the glove.

For easy fitting of the lid-shaped member to the second open end, it is preferable that the opening of the second open end is defined by an inner periphery of a collar portion having an annular flat surface and protruding inwardly of the tubular container while the lid-shaped member comprises an outer peripheral portion to overlap the annular flat surface of the collar portion, and a fitting portion to be fitted into the opening of the second open end.

Such an arrangement desirably has a feature that the fixing mechanism is mounted to the lid-shaped member and comprises an engagement member capable of rotating to engage the tubular container, and a rotation manipulating portion for rotating the engagement member when manipulated. This feature makes it possible to simplify the lid-shaped member fixing operation as well as to ease the fitting/removal of the lid-shaped member to and from the tubular container.

In a specific embodiment of the fixing mechanism, the engagement member is a rod member disposed on one side of the lid-shaped member for engaging a peripheral portion around the opening of the second open end of the tubular container, while the rotation manipulating portion comprises a grip portion disposed on an opposite side of the lid-shaped member, and a rotating shaft interconnecting the grip portion and the rod member. With this feature, the fixing mechanism can have a simplified structure. In this case, advantageously, a rotation restricting mechanism is disposed between the grip portion and the lid-shaped member for stopping the rod member at a predetermined position in order to allow the user to check whether the rotation manipulating portion has been manipulated based on positional relations resulting from the manipulation without visually observing the manipulation.

For the lid-shaped member to be returned into the cabinet easily, the second open end preferably has an internal dimension larger than a smallest external dimension of the lid-shaped member. In a specific embodiment, the opening of the second open end is elliptic. The shape of the opening of the second open end is not limited to an elliptic shape, but may be any other shape except circular shape, for example, square, rectangle, parallelogram, lozenge, trapezoid and triangle. Therefore, there is no particular limitation on the shape of the opening as long as the aforementioned dimensional relation is satisfied.

For the tubular container to be fitted to the cabinet easily, the tubular container preferably has an external surface formed with an engagement collar to be engaged with the cabinet for fitting the tubular container to the cabinet.

For the glove contained in the container to be confined within the container, it is preferred that the glove fitting device further comprises a lid member to be removably fitted to the tubular container for closing the opening of the first open end of the tubular container.

An example of the cabinet to be fitted with the glove fitting device is a cabinet housing a rotary powder compression molding machine body. This feature makes it possible to use the rotary power compression molding machine body housed in the cabinet in compression molding of, for example, a raw material power that may be detrimental to human body and allows maintenance or like operations to be achieved through the glove.

In the present invention, the term "power" means a collection of solid particles irrespective of the particle size and includes collections of solid particles having a particle diameter ranging from several micrometers to several millimeters. Such particles having a particle diameter of several millimeters are generally referred to as "granule". There is no particular limitation on the material of the powder as long as the powder can be molded under compression. Examples of such materials include various materials such as drug, metal and synthetic resin.

According to the present invention, when the lid-shaped member is fitted to the second open end of the tubular container by the fixing mechanism, the glove cannot come out of the tubular container through the opening of the second open end. Therefore, the glove will not hinder the operation for removing the tubular container from the cabinet and, hence, smooth removal of the tubular container is possible. Moreover, since the glove is still kept contained in the tubular container hermetically closed at its second open end during transport of the tubular container to a predetermined replacement site for replacement of glove, the transporting operation can proceed safely without the glove contacting any matter existing therearound even if a substance that affects the environment is attached to the glove.

The foregoing and other objects, features and attendant advantages of the present invention will become apparent from the reading of the following detailed description in conjunction with the accompanying drawings.

DETAILED DESCRIPTION OF THE PREFERRED EMBODIMENTS

Figure 6:
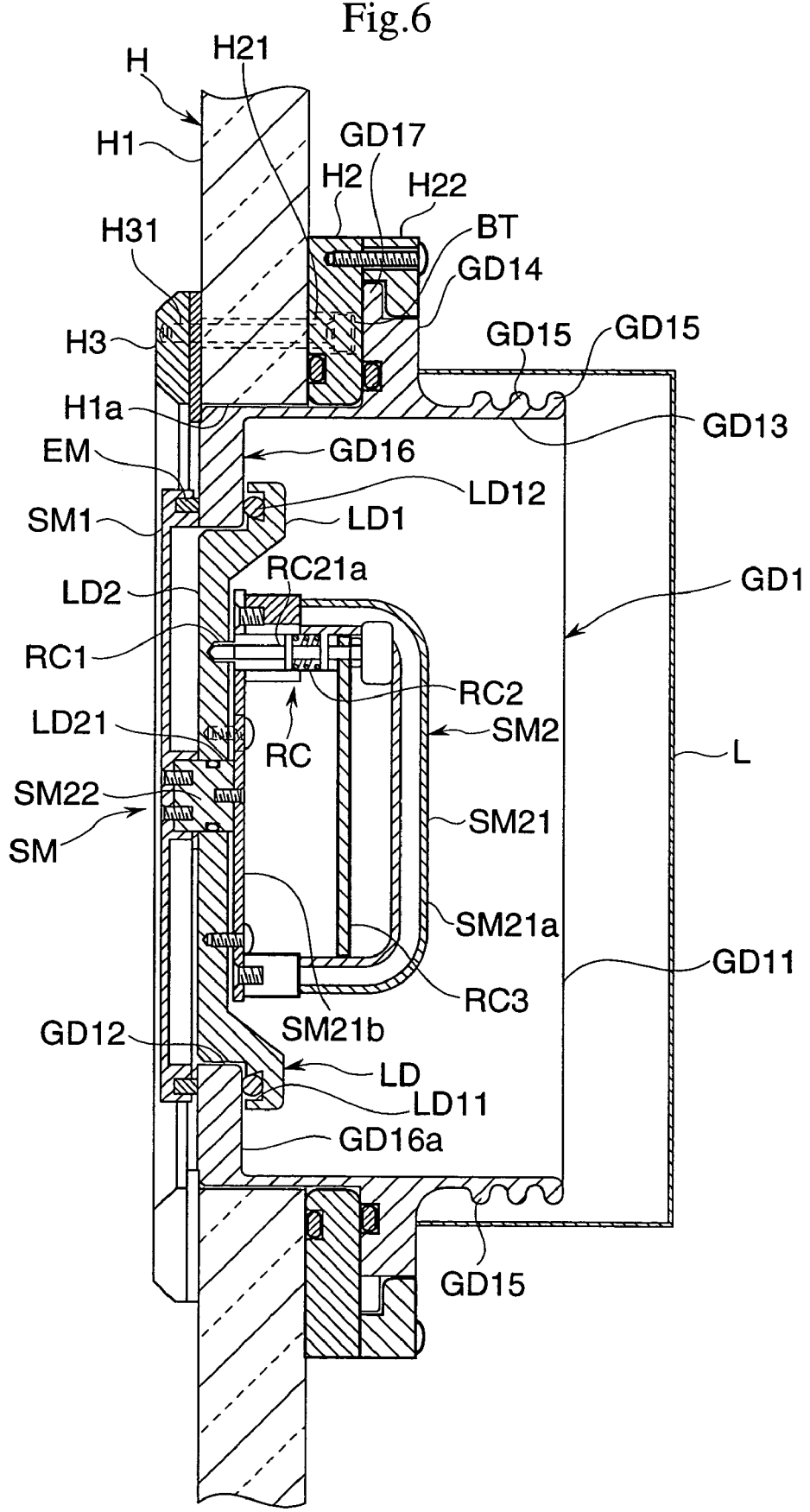
FIG. 6 is a sectional view of the glove fitting device according to the same embodiment.
Figure 7:
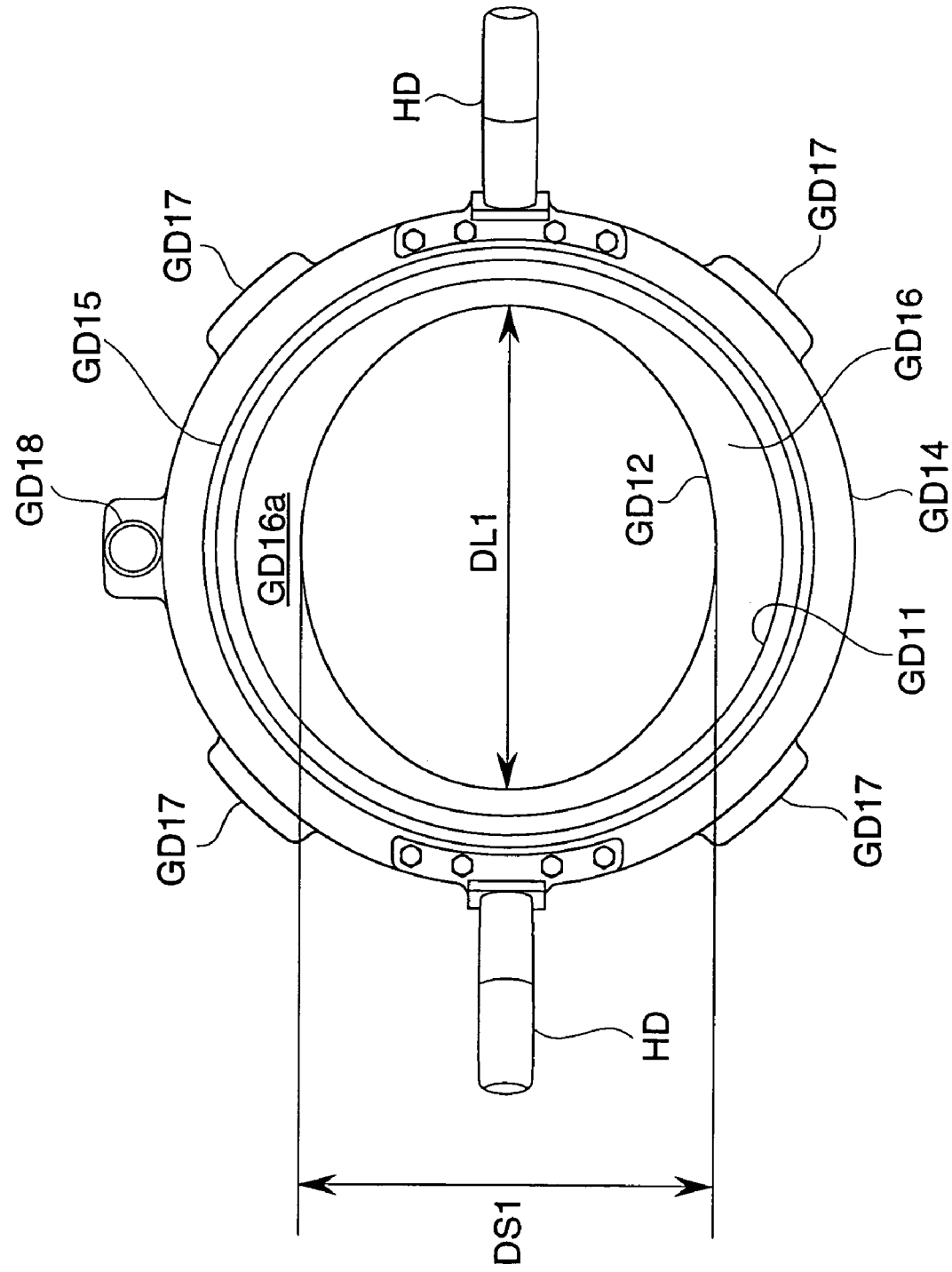
FIG. 7 is a front elevational view showing a tubular container forming part of the glove fitting device according to the same embodiment.
Figure 8:
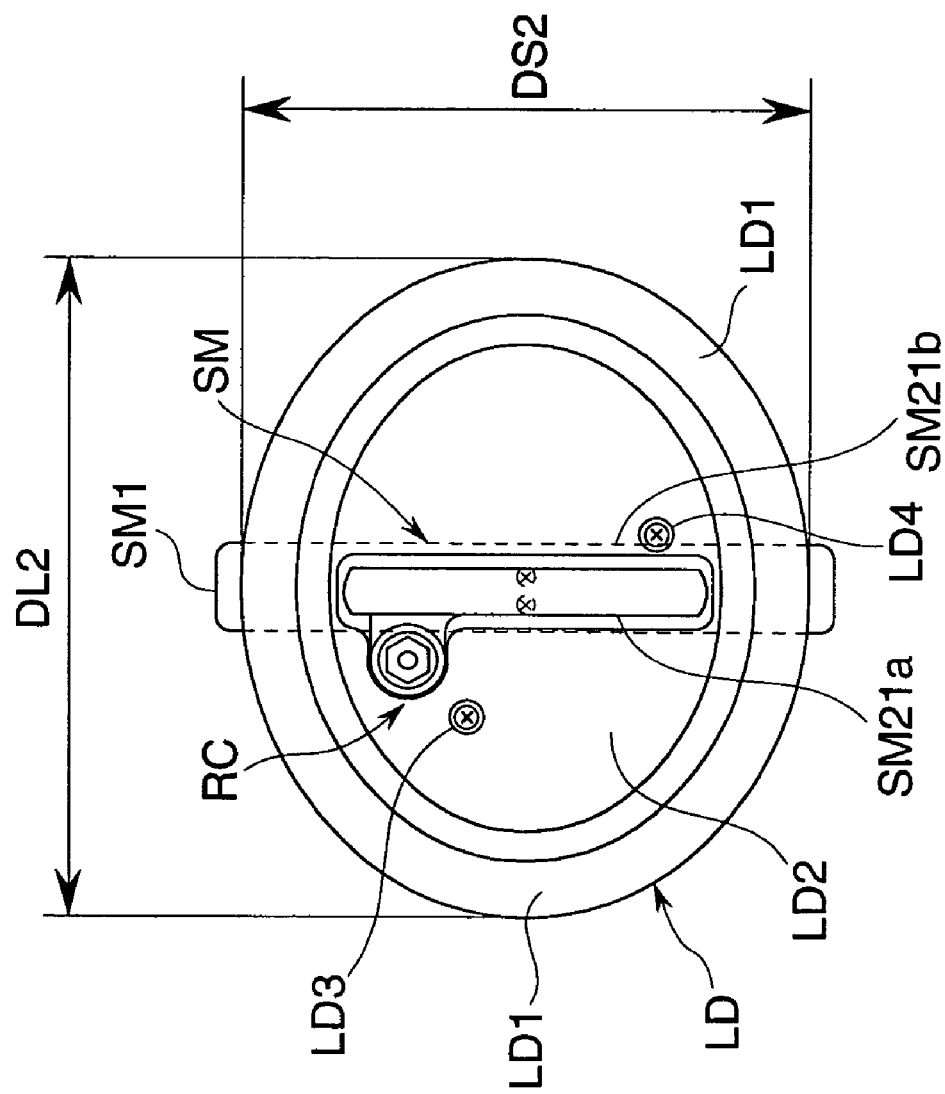
FIG. 8 is a front elevational view showing a lid-shaped member forming part of the glove fitting device according to the same embodiment.
Figure 9:
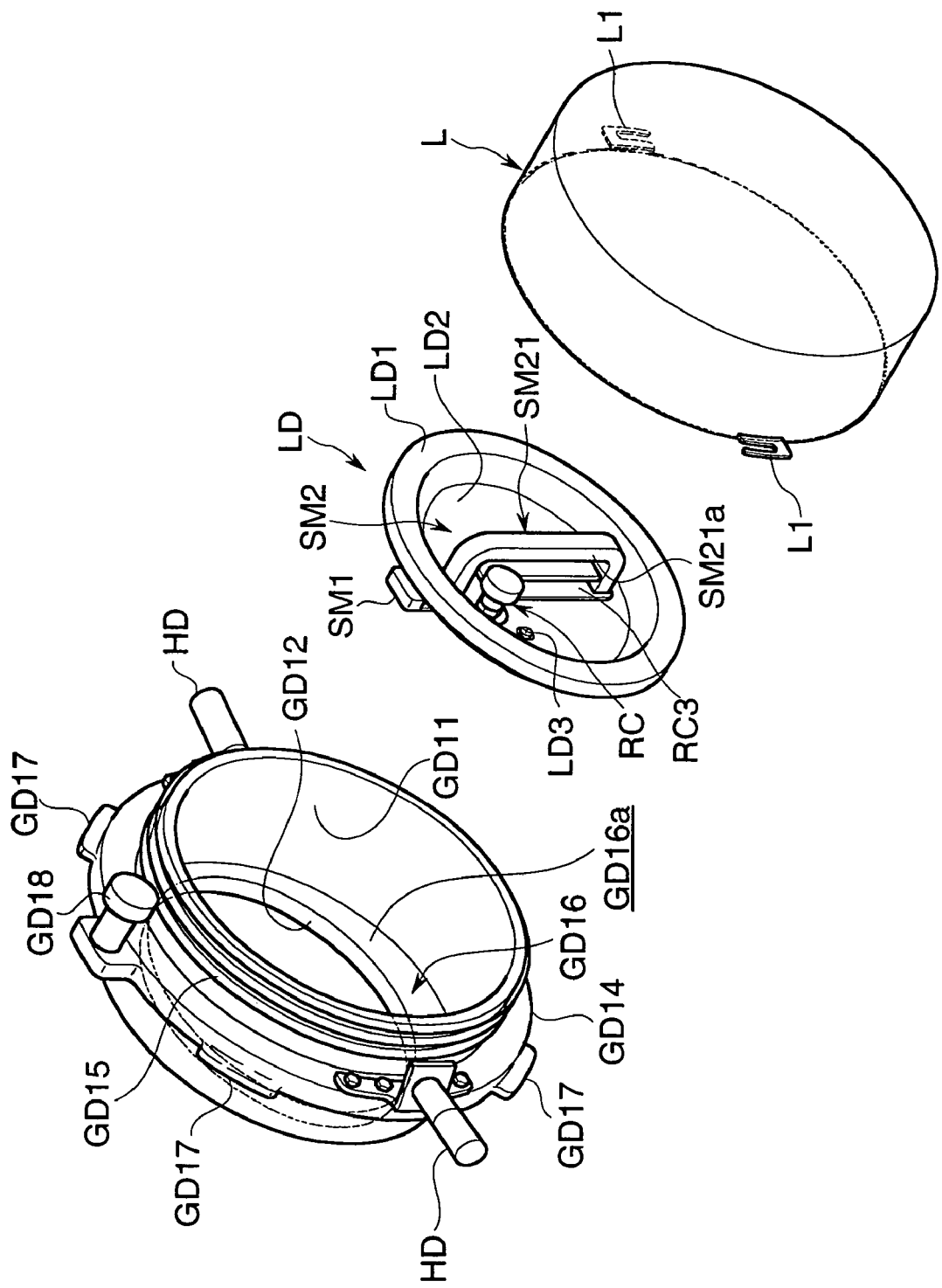
FIG. 9 is an exploded perspective view of the glove fitting device according to the same embodiment.
Figure 10:
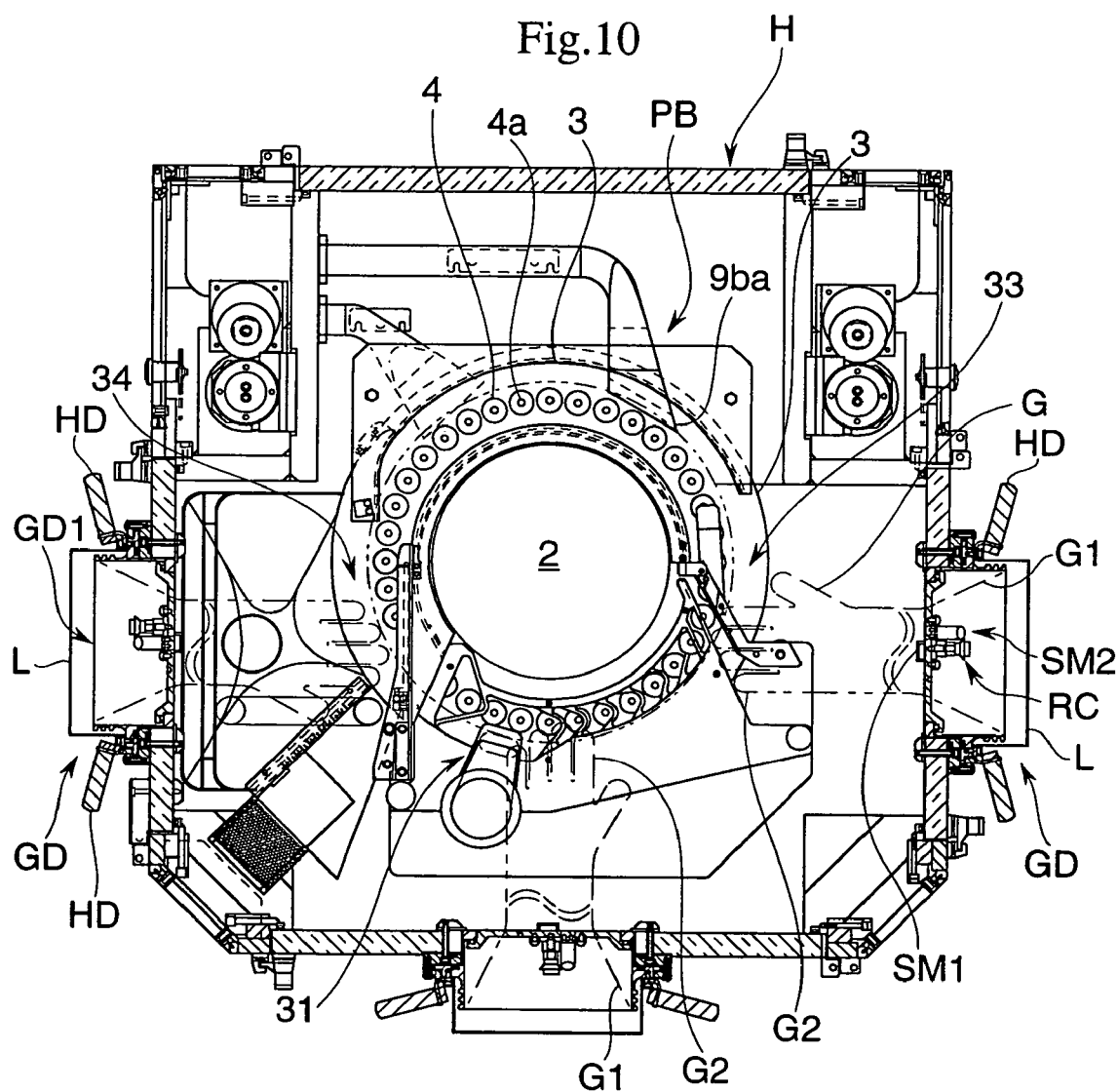
FIG. 10 is a transverse sectional view showing a structure inside the cabinet and above a rotary table according to the same embodiment.

Hereinafter, one embodiment of the present invention will be described in detail with reference to the accompanying drawings. It should be noted that FIG. 6 is a sectional view taken so as to clearly show the structure of engagement between an engaging lug GD17 and an engaged portion H22 and the structure of a rotation restricting mechanism RC associated with a fixing mechanism SM in a glove fitting device GD to be described later and that FIG. 10 is a transverse sectional view in which glove fitting devices fitted on the front side, right-hand side and left-hand side of a cabinet H are shown in respective appropriate sections taken so as to present their respective sectional views notwithstanding the fact that they are fitted at different height levels.

Figure 11:
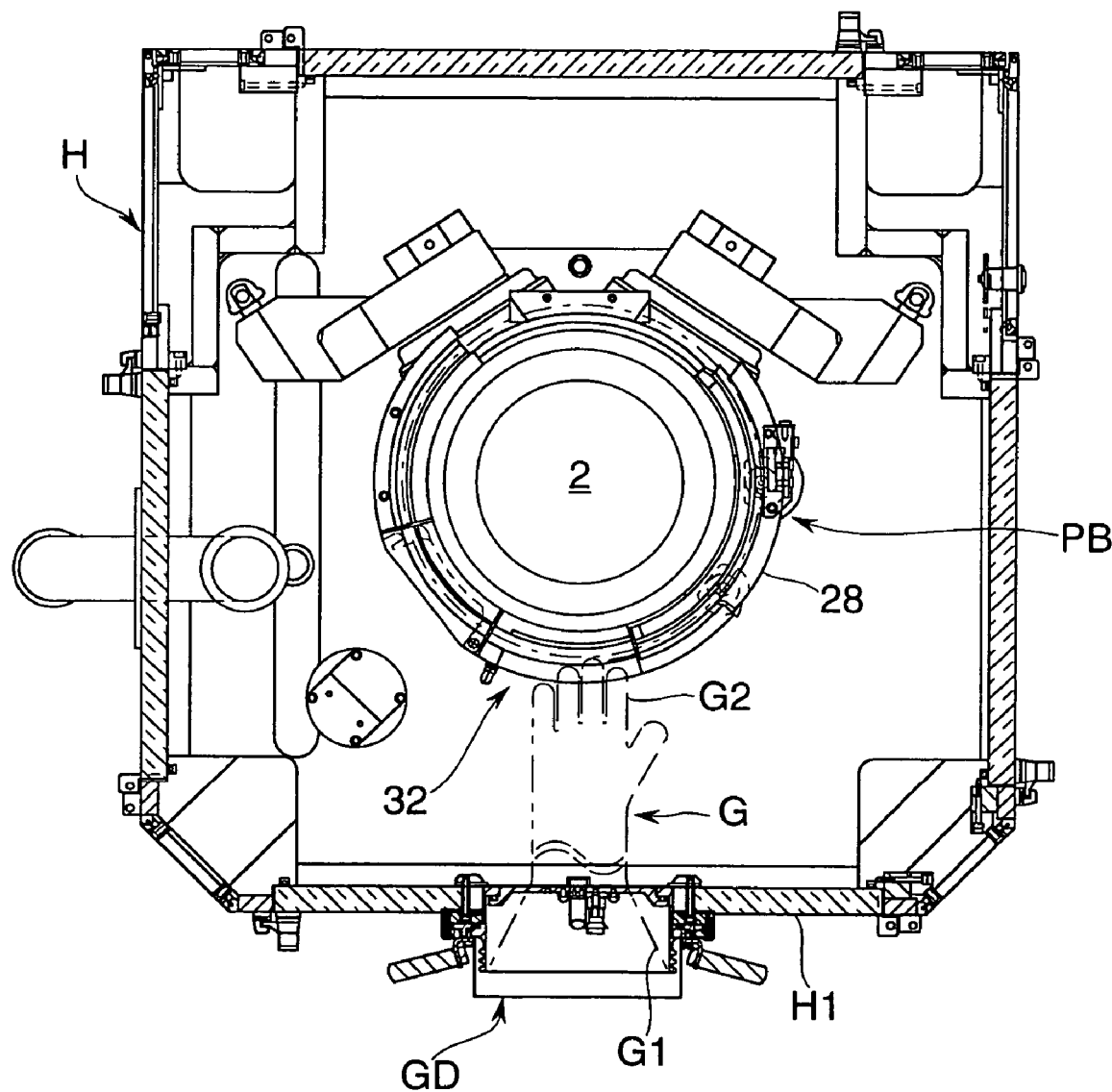
FIG. 11 is a plan view showing a structure inside the cabinet and below the rotary table according to the same embodiment.

In this embodiment, a rotary powder compression molding machine body (hereinafter will be referred to as "molding machine body") PB is housed within the cabinet H to be fitted with the glove fitting device GD of the present invention. Thus, the molding machine body PB and the cabinet H, as a whole, function as a rotary powder compression molding machine PM. As shown in FIGS. 10 and 11, glove fitting devices GD are removably fitted to the cabinet H at upper locations on respective of the front side and opposite lateral sides of the cabinet H so that a finger portion G2 forming the distal end of each glove G can reach a position above a rotary table 3 of the molding machine body PB to be described later when the glove G is stretched, while another glove fitting device GD removably fitted to the cabinet H at a lower location on the front side of the cabinet H so that a finger portion G2 forming the distal end of glove G can reach a position below the rotary table 3.

Figure 5:
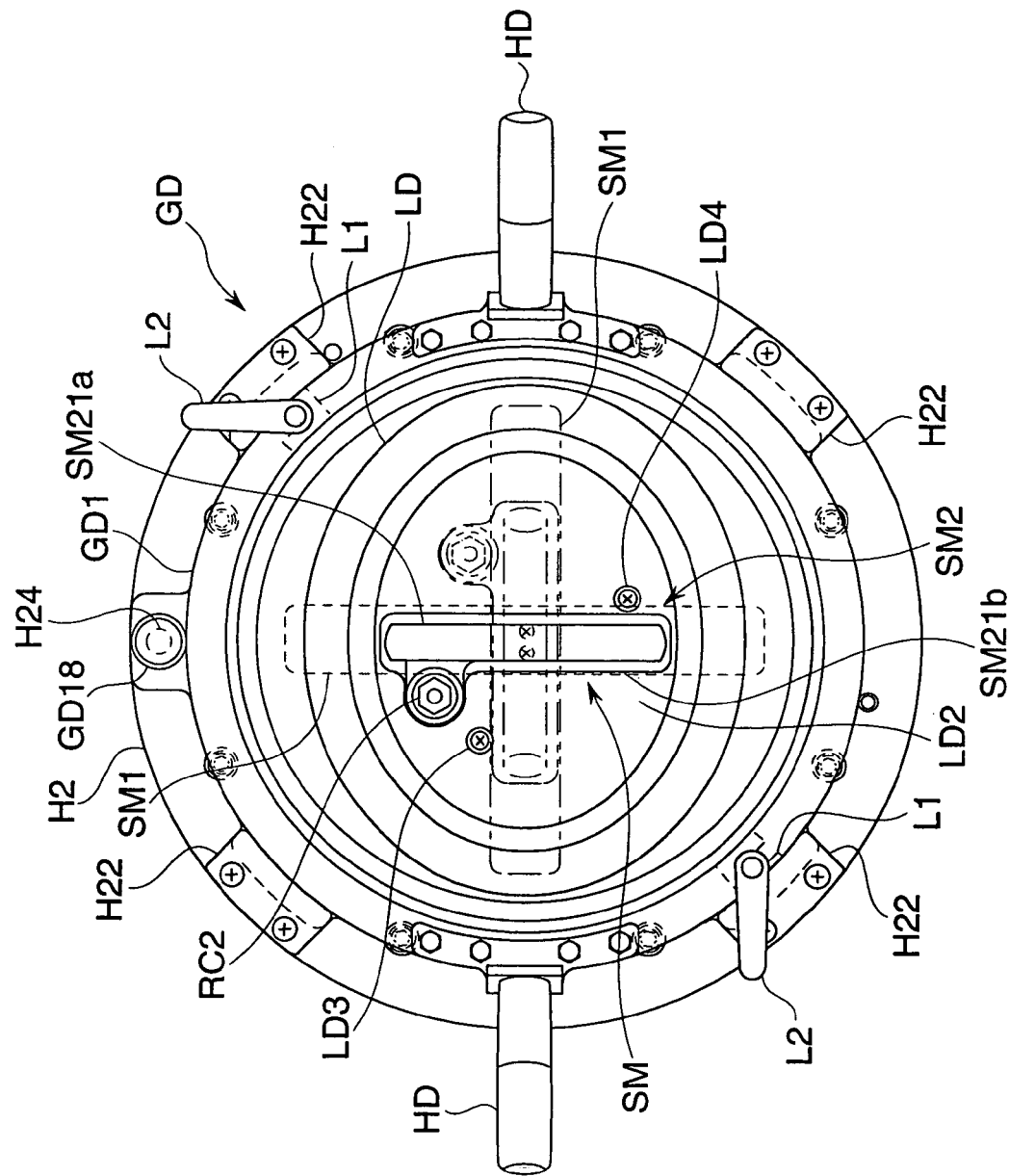
FIG. 5 is a front elevational view showing a glove fitting device according to the same embodiment.

As shown in FIGS. 5 to 9, each of the glove fitting devices GD includes: a tubular container GD1 having opposite first and second open ends GD11 and GD12 defining a circular opening and an elliptic opening, respectively, the first open end GD11 being configured to allow glove G to be replaceably fitted thereto; a lid-shaped member LD to be removably fitted to the second open end GD12 of the tubular container GD1 from inside of the tubular container GD1 to prevent the glove G from coming out of the tubular container GD1 through the opening of the second open end GD12, the second open end GD12 becoming oriented inwardly of the cabinet H when the tubular container GD1 is fitted to the cabinet H; a fixing mechanism SM for fixing the lid-shaped member LD to the second open end GD12; and a lid member L to be removably fitted to the tubular container GD1 for closing the opening of the first open end GD11. FIG. 5 shows the glove fitting device GD in a state where the glove G and the lid member L are removed so as to show the internal structure of the glove fitting device GD clearly.

The cabinet H includes outer peripheral wall comprising a flat plate member H1 formed from a transparent synthetic resin such as an acrylic resin, and an annular mounting member H2 extending around an opening H1*a* defined at front flat plate member H1 on the external side thereof for fitting the tubular container GD1 thereto. The mounting member H2 is secured to the outer peripheral wall by inserting bolts BT into respective through-holes H21 spaced at predetermined intervals circumferentially of the mounting member H2 and then bringing each bolt BT into thread engagement with a female screw hole H31, which is defined in an annular female screw member H3 disposed on the internal side of the flat plate member H1 so as to face the corresponding through-hole H21. The mounting member H2 has an external surface formed with four engaged portions H22 at different locations for engagement with respective engaging lugs GD17 to be described later for fitting the tubular container GD1 to the mounting member H2 and with a positioning hole H24 for engagement with a positioning member GD18 of the tubular container GD1 to be described later. Each of the engaged portions H22 and the external surface of the mounting member H2 define a space therebetween for receiving the corresponding engaging lug GD12.

The tubular container GD1 includes a cylindrical member GD13 formed with an engagement collar GD14 at a longitudinally central portion thereof for fitting the tubular container GD1 to the cabinet H and with annular ridges GD 15 spaced at predetermined intervals on an outer peripheral surface thereof adjacent the first open end GD11 for the glove G to be removably fitted to the tubular container GD1 with its open end portion G1 fitted over the annular ridges GD15. The number of such annular ridges GD15 is three for example. The cylindrical member GD13 of the tubular container GD1 is further formed at an inner peripheral portion of the second open end GD12 with a collar portion GD 16 having an annular flat surface GD16a. The engagement collar GD14 is fitted with handles HD for facilitating the fitting/removal of the tubular container GD1 to and from the cabinet H.

The engagement collar GD14 has the four engaging lugs GD17 at different locations for fitting the tubular container GD1 to the cabinet H and is fitted with the positioning member GD18 for determining the fitting position of the tubular container GD1. The positioning member GD18 has an outwardly biased ball at its tip and achieves the positioning of the tubular container GD1 when the ball engages the positioning hole H24 after having slid on the surface of the mounting member H2. The engaging lugs GD17 are formed integral with the engagement collar GD14 in a manner to project diametrically from the outer periphery of the engagement collar GD14. The engaging lugs GD17 have a thickness about ½ as large as the thickness of the engagement collar GD14.

The collar portion GD16 is formed integral with the cylindrical member GD13, and the opening of the second open end GD12 is defined by a space encircled with the inner periphery of the collar portion GD16, namely, with the annular flat surface GD16a. The collar portion GD16 is made thicker than the cylindrical member GD13 so that the positioning of the lid-shaped member LD can be achieved easily in closing the second open end GD12 with the lid-shaped member LD. The opening of the second open end GD12 becomes oriented inwardly of the cabinet H and takes the form of a horizontally-long ellipse when the tubular container GD1 is fitted to the cabinet H. The dimension of the major axis DL1 of the elliptic opening is made smaller than the internal diameter of the cylindrical member GD13. The second open end GD12 has a major internal dimension which is larger than the smallest external dimension of the lid-shaped member LD in plan, namely, the dimension of the minor axis DS1 of the ellipse. That is, the inside measurement of the major internal dimension of the second open end GD12 corresponds to the major axis DL1 of the ellipse. The minor internal dimension of the second open end GD12 corresponding to the minor axis DS1 of the elliptic opening of the second open end GD12 is set larger than the distance between one side of fitting portion LD2 of the lid-shaped member LD and the highest portion of pipe member SM21a of grip portion SM21.

The lid-shaped member LD has an elliptic plane configuration having larger outer dimensions (major axis DL2 and minor axis DS2) than the opening of the second open end GD12. The lid-shaped member LD comprises an outer peripheral portion LD1 to overlap the flat surface GD16a of the annular collar portion GD16, and the fitting portion LD2 to be fitted into the opening of the second open end GD12. The outer peripheral portion LD1 has a surface to confront the annular collar portion GD16, the surface being formed with a groove LD11 extending to encircle the opening of the second open end GD12. A ring-shaped resilient sealing member LD12, such as an O-ring, is fitted in the groove LD11. The fitting portion LD2 is protruded from the surface formed with the groove LD11 so that its surface oriented inwardly of the cabinet H becomes substantially flush with the internal surface of the annular collar portion GD16 oriented inwardly of the cabinet H when the second open end GD12 is closed. In this embodiment, the fixing mechanism SM is mounted to the fitting portion LD2. The fitting portion LD2 centrally defines a shaft hole LD21 for insertion of a rotating shaft SM22 of the fixing mechanism SM to be described later. Also, the fitting portion LD2 defines a locking hole RC1 forming part of the rotation restricting mechanism RC at a predetermined location.

The fixing mechanism SM comprises an engagement member SM1 to be rotated for engagement with the peripheral portion around the opening of the second open end GD12, i.e, the surface of the collar portion GD16 facing the cabinet H, and a rotation manipulating portion SM2 for rotating the engagement member SM1 when manipulated.

The engagement member SM1 comprises a rod member disposed on one side of the lid-shaped member LD which becomes oriented inwardly of the cabinet H when the glove fitting device GD is fitted to the cabinet H. The engagement member SM1 has a length longer than the minor axis DS1 of the opening of the second open end GD12 and shorter than the major axis DL1 of that opening. The engagement member SM1 is fitted at its opposite ends with resilient members EM formed of a synthetic resin or a natural or synthetic rubber for example, thereby biasing the lid-shaped member LD toward the collar portion GD16. As the engagement member SM1 is rotated, the engagement member SM1 assumes a position (indicated with broken line in FIG. 5) in which the opposite ends thereof project from opposite peripheral edges of the lid-shaped member LD along the minor axis of the lid-shaped member LD (in the vertical direction) and a position (indicated with long dashed double-dotted line in FIG. 5) in which the opposite ends thereof are positioned inwardly of opposite peripheral edges of the lid-shaped member LD along the major axis of the lid-shaped member LD (in the horizontal direction).

The rotation manipulating portion SM2 comprises the grip portion SM21 disposed on the other side of the lid-shaped member LD which becomes oriented inwardly of the tubular container GD1, and the rotating shaft SM22 interconnecting the grip portion SM21 and the engagement member SM1.

The grip portion SM21 includes a pipe member SM21a having opposite end portions which are bent in the same direction and provided with female screws, a coupling member SM21b for fixing the pipe member SM21a to the rotating shaft SM22, a locking rod member RC2 attached to the coupling member SM21b and forming part of the rotation restricting mechanism RC for stopping the engagement member SM1 at a predetermined position, and a manipulating member RC3 for manipulating the locking rod member RC2.

The coupling member SM21b is fitted to the rotating shaft SM22 so as to be spaced from the opposed surface of the fitting portion LD2 of the lid-shaped member LD, that is, so as not to contact the opposed surface. The locking rod member RC2 attached to the coupling member SM21b is so structured as to bias a pin RC21a toward the locking hole RC1 to insert it into the locking hole RC1. The locking rod member RC2 is coupled to the manipulating member RC3 disposed between the pipe member SM21a and the coupling member SM21b. By moving the manipulating member RC3 toward the pipe member SM21a, the locking rod member RC2 is disengaged from the locking hole RC1.

The lid member L is a bottomed cylindrical member sized to embrace a portion of the cylindrical member GD13 extending to the engagement collar GD 14 inclusive of the first open end GD11 in a state fitted with the glove G. The lid member L has a pair of hooks L1 on an outer peripheral surface adjacent its opening. The lid member L can be brought into intimate contact with and fixed to the engagement collar GD14 by engaging the hooks L1 with respective clamps L2 and then clamping the hooks L1 firmly.

The cabinet H to be fitted with the glove fitting device GD houses the molding machine body PB therein. Thus, the cabinet H together with the molding machine body PB housed therein functions as rotary powder compression molding machine PM.

Figure 1:
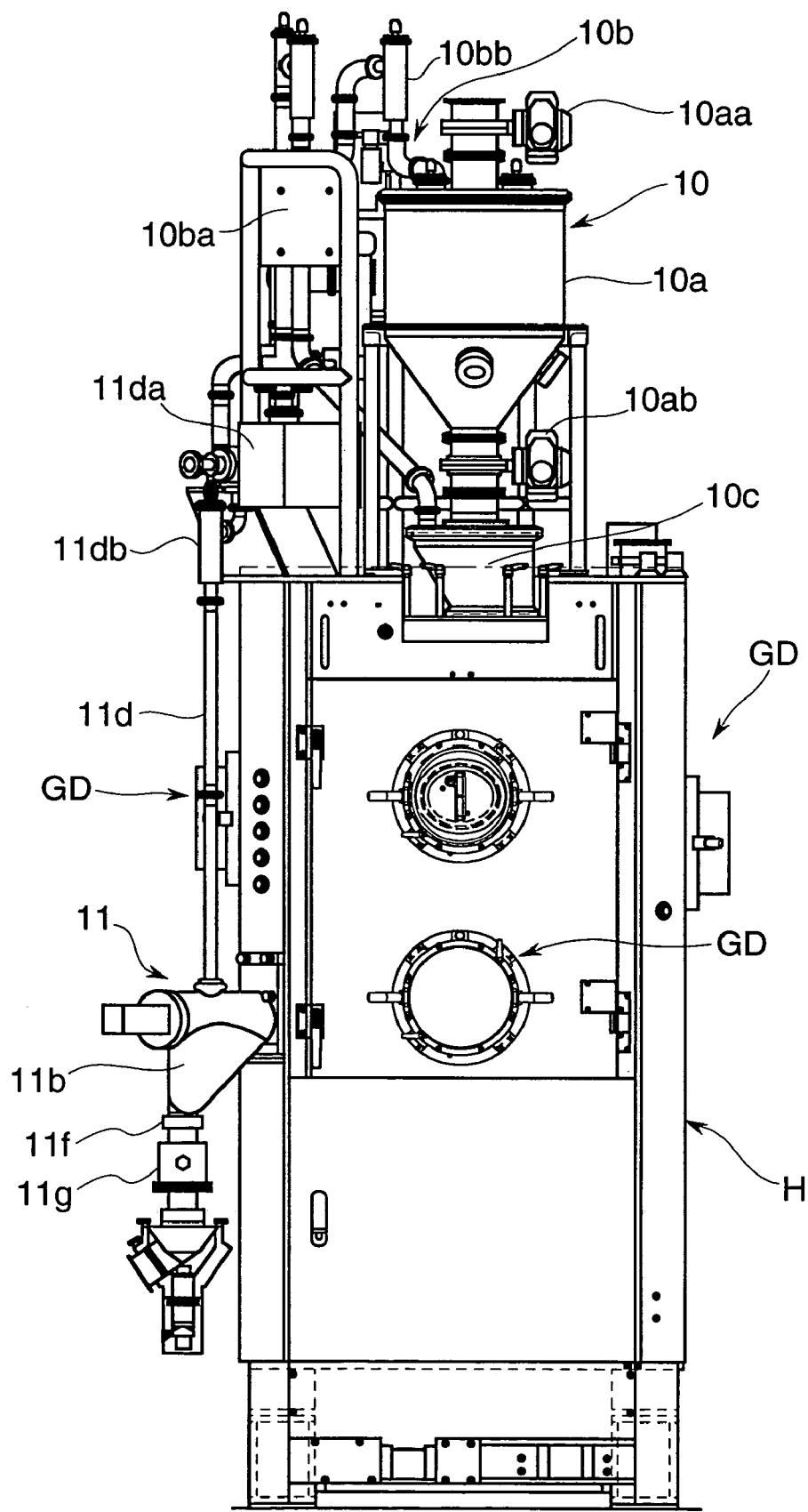
FIG. 1 is a front elevational view showing a rotary powder compression molding machine in a state where a cabinet is fitted with glove fitting devices according to an embodiment of the present invention.
Figure 2:
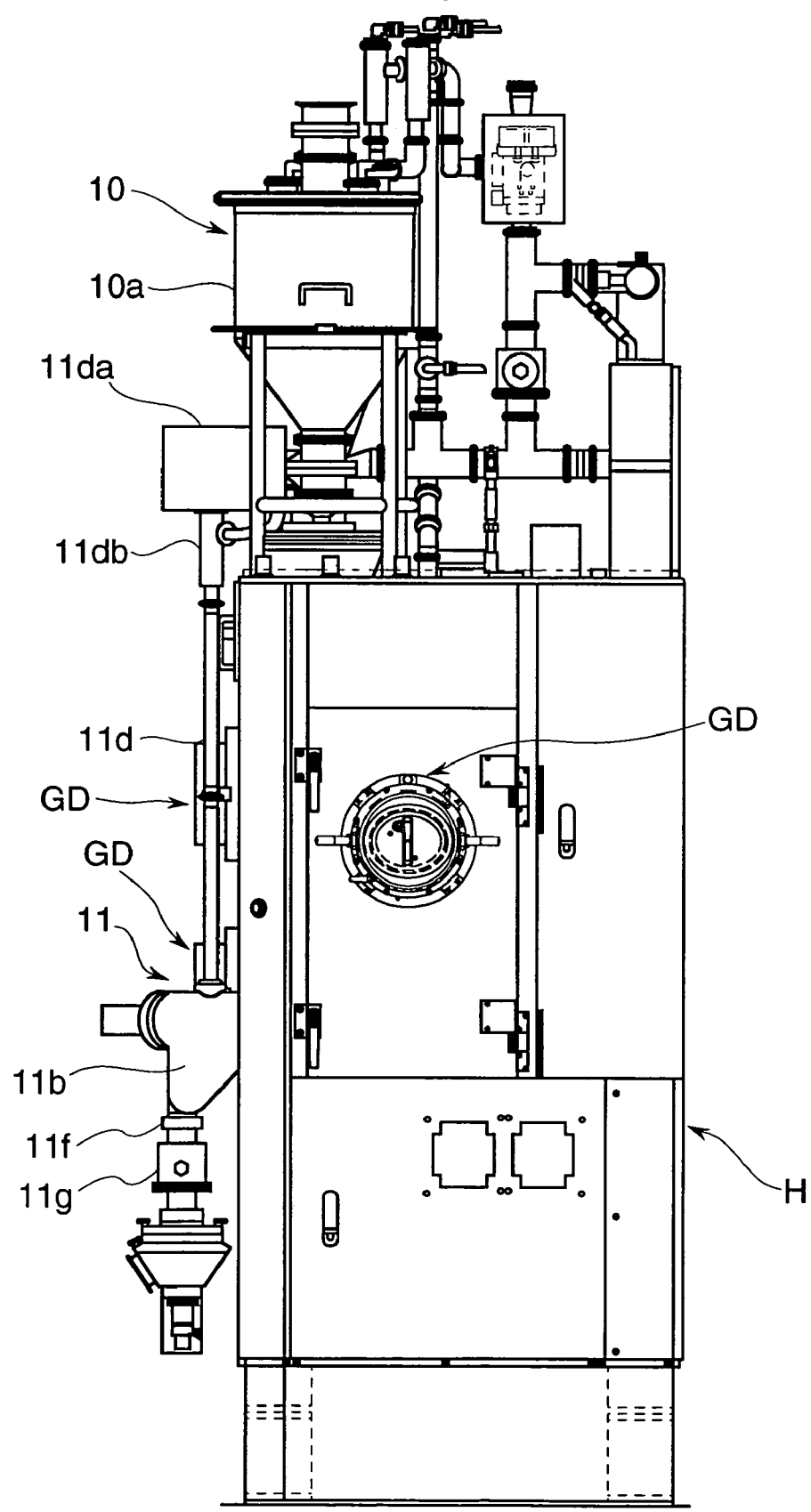
FIG. 2 is a right-hand side elevational view of the rotary powder compression machine in the state where the cabinet is fitted with the glove fitting devices according to the same embodiment.
Figure 3:
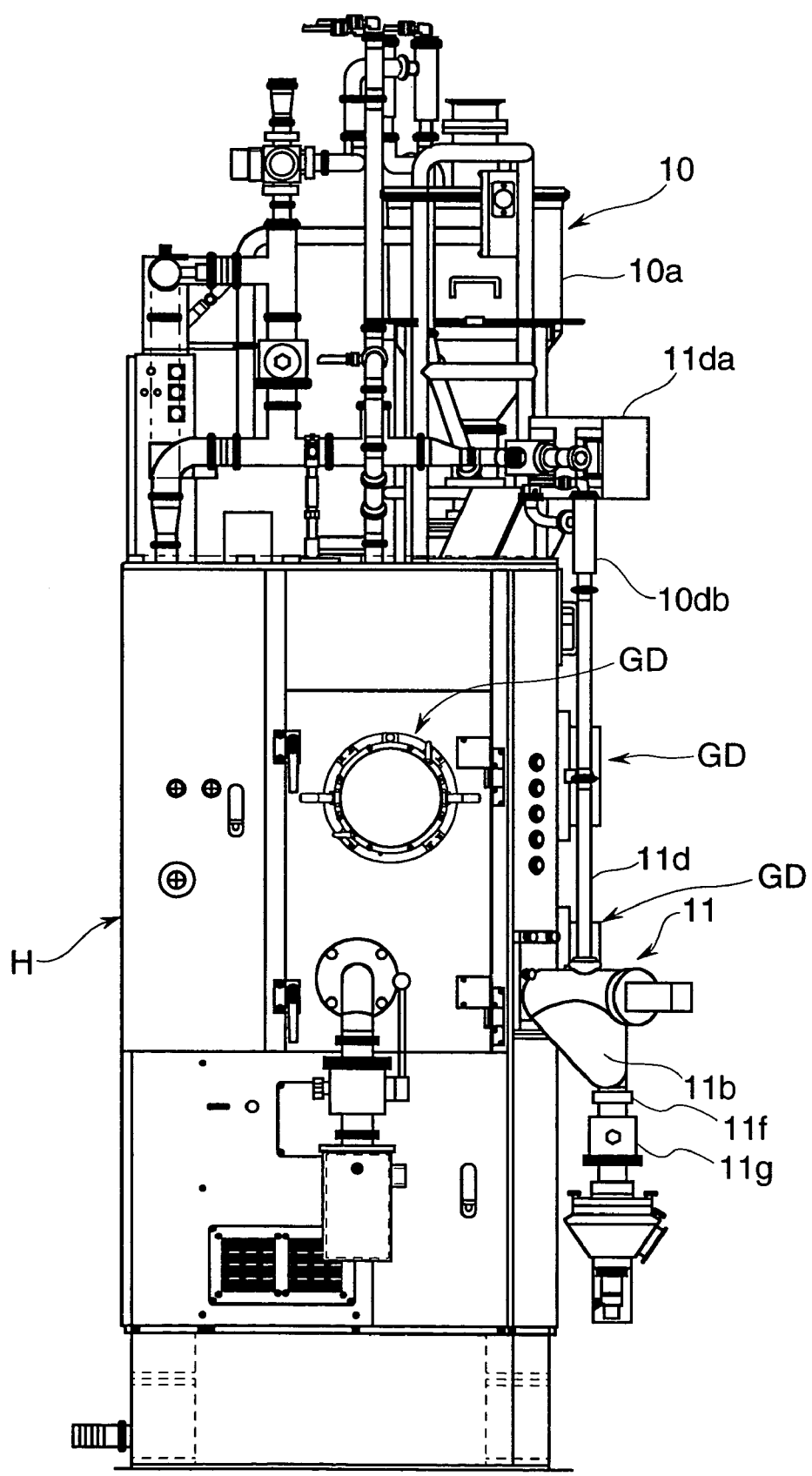
FIG. 3 is a left-hand side elevational view of the rotary powder compression machine in the state where the cabinet is fitted with the glove fitting devices according to the same embodiment.
Figure 4:
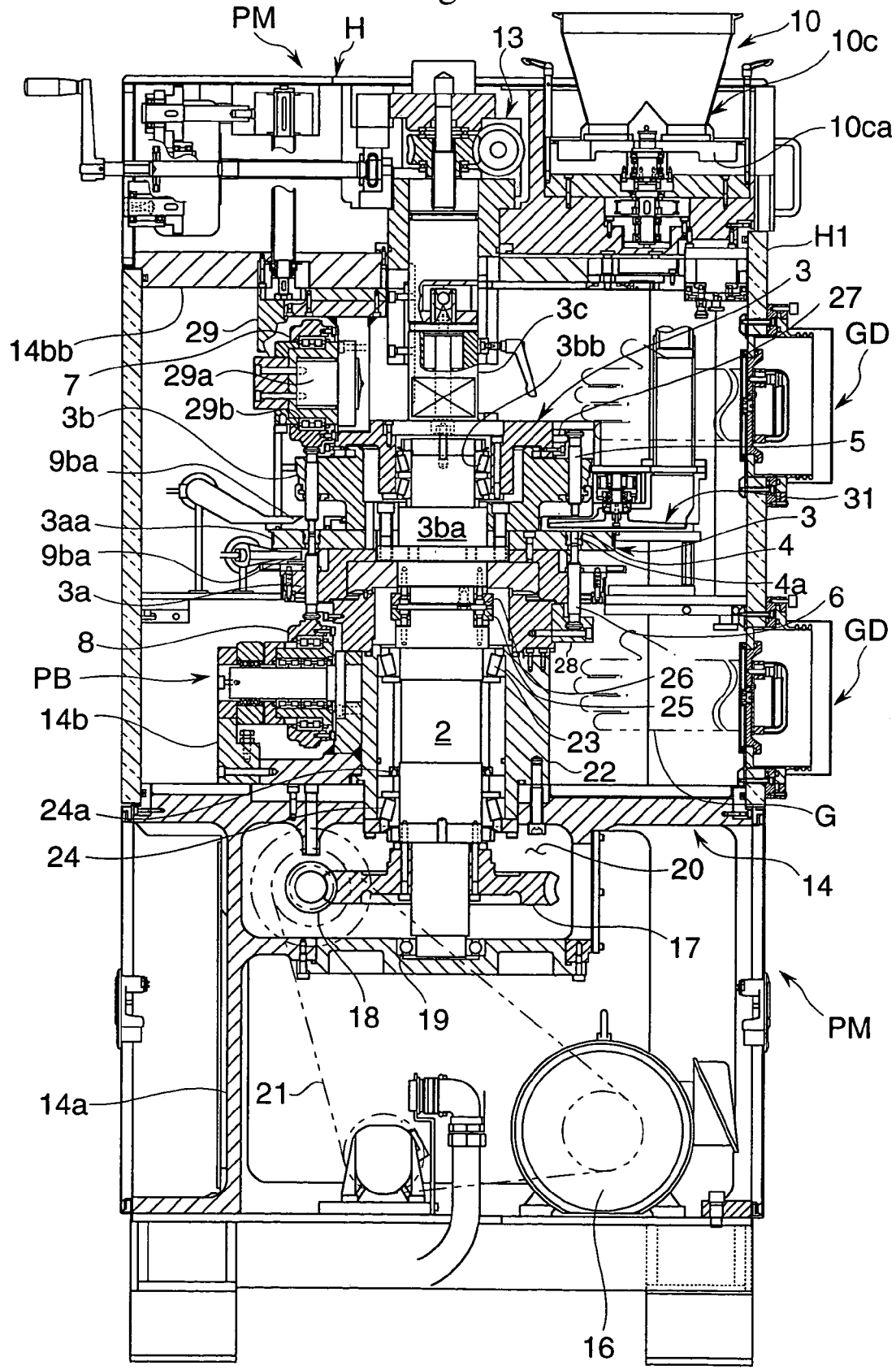
FIG. 4 is a sectional view of the rotary powder compression machine in the state where the cabinet is fitted with the glove fitting devices according to the same embodiment.

In the sectional side elevational view at FIG. 4, upper and lower rolls 7 and 8 are shown in side view for easy understanding of their structures and only one of a combination of upper and lower rolls 7,8 for pre-compression and a combination of upper and lower rolls 7,8 for main compression which are paired with each other is shown. Further, for clear showing of positional relation among a frame 14, vertical shaft 2, rotary table 3, lifting mechanism 13 and the like, a portion for removing molded products and like portions are not shown. Though each of the glove fitting devices GD is shown with the lid-shaped member LD in the closed state, each glove G is shown in a state stretched into the machine with phantom line.

Figure 12:
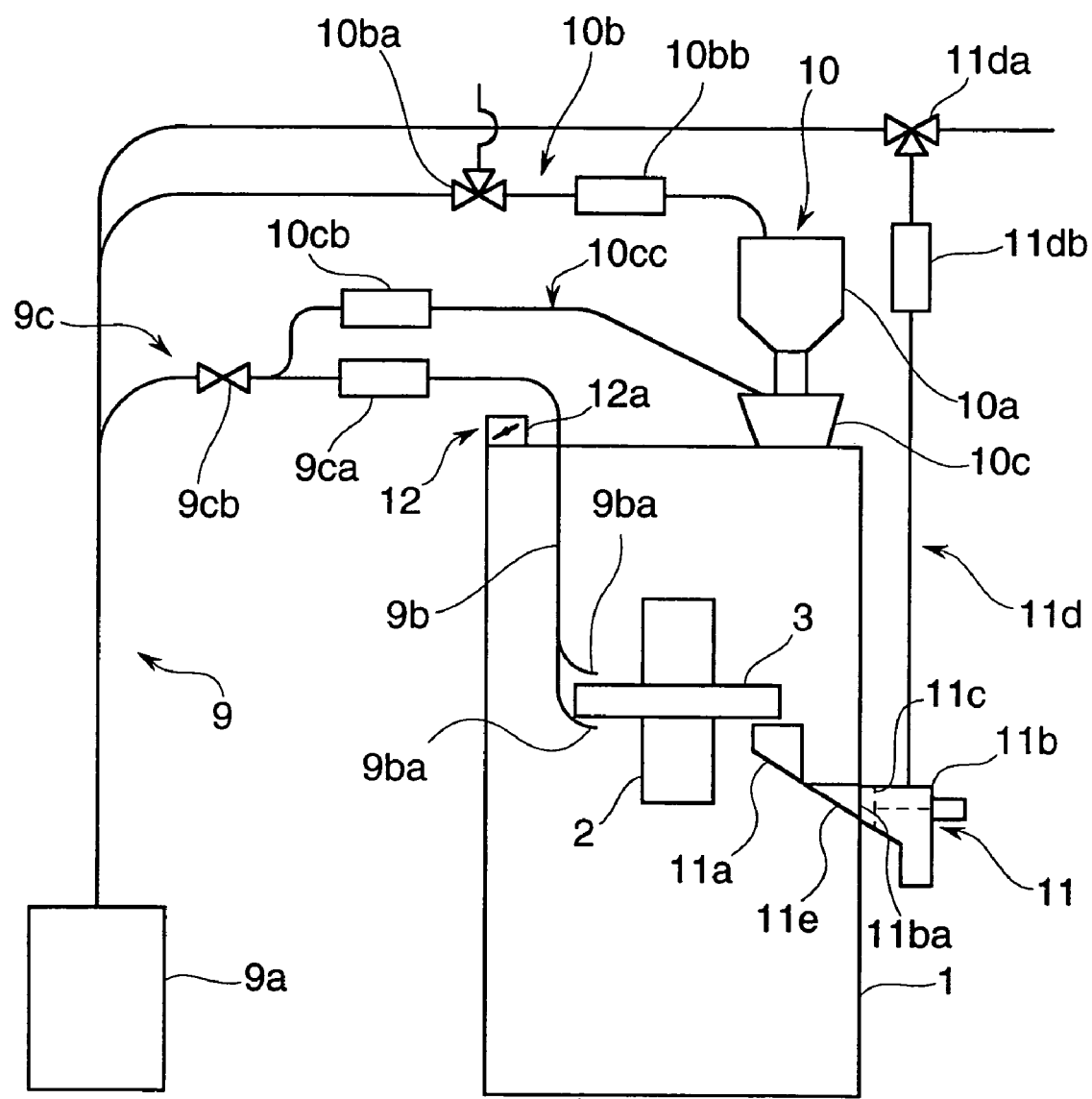
FIG. 12 is a block diagram showing an arrangement of pipelines associated with the rotary powder compression machine according to the same embodiment.

As shown in FIG. 4, the molding machine body PB includes the rotary table 3 horizontally rotatably disposed in the cabinet H by means of the vertical shaft 2, a plurality of dies 4 fitted to the rotary table 3 at a predetermined pitch, each die 4 having a die bore 4a, and upper punch 5 and lower punch 6 vertically slidably held above and below each die 4. Upper rolls 7 for pressing upper punches 5 and lower rolls 8 for pressing lower punches 6 are positioned above and below the rotary table 3 and about the vertical shaft 2. Raw material powder or granule loaded in each die bore 4a is compression-molded by causing the upper and lower punches 5 and 6 with their respective tip ends inserted in the die bore 4a to pass through between upper rolls 7 and lower rolls 8. As shown in FIG. 12, the rotary powder compression molding machine PM further includes a discharge mechanism 9 for discharging the atmosphere inside the cabinet H to adjust the internal pressure of the cabinet H to a reduced pressure which is lower than atmospheric pressure during operation at least, a raw material feeding section 10 of which the internal pressure is kept at atmospheric pressure during take-in of the raw material while being reduced during feeding or payout of the raw material into the cabinet H, a molded product delivery section 11 of which the internal pressure is reduced during take-in of molded products while being kept at atmospheric pressure during payout of molded products to the outside, and an open air introducing section 12 for introducing open air into the cabinet H.

Additionally, this embodiment is configured to allow the rotary table 3 in a state fitted with the upper punches 5 and the lower punches 6 to be detached from the vertical shaft 2. Specifically, in separating the rotary table 3 from the vertical shaft 2, the rotary table 3 is once lifted by the lifting mechanism 13 and then removed out of the cabinet H by a carrying device (not shown). Since the upper rolls 7 interfere with the lifting of the rotary table 3 in detaching the rotary table 3 from the vertical shaft 2, each of the upper rolls 7 is configured to be movable to a position at which such interference can be avoided.

The cabinet H includes a frame and the flat plate member H1 as an enclosure member mounted on the frame 14 to close the internal space surrounded by the frame 14 hermetically. That is, the cabinet H allows the frame 14 to be attached with mechanical parts required for compression molding such as the rotary table 3 while defining therein a hermetically closed space by embracing the frame 14 with the flat plate member H1. The frame 14 comprises a lower frame 14a and an upper frame 14b fixed on the lower frame 14a. This structure is basically intended to partition the internal space into a molding section for compression molding and a driving section for driving the rotary table 3 in the molding section. In such an arrangement, it is sufficient to close at least only the space defined by the upper frame 14a hermetically.

Specifically, within the lower frame 14a is mounted a main drive motor 16 above which is formed a gear chamber 20 housing a worm wheel 17, a worm 18 meshing with the worm wheel 17 and a vertical shaft lower bearing 19 supporting the vertical shaft 2 by the lower end for rotation. Rotation of the main drive motor 16 is transmitted to the worm 18 through belt 21. On top of the gear chamber 20 is secured a support member 22 supporting the vertical shaft 2. Upper and lower taper roller bearings 23 and 24 having hermetic sealing properties bear the vertical shaft 2 for rotation on the side inward of the support member 22. The airtightness of the upper frame 14b fails to lower due to leakage of air from the periphery of the vertical shaft 2 by virtue of the lower taper roller bearing 24 sealed with oil seal 24a. Such a structure isolates the internal space within the lower frame 14a inclusive of the gear chamber 20 from the upper space defined by the upper frame 14b. That is, no air communication occurs between the two spaces and, hence, the reduced pressure condition of the upper space defined by the upper frame 14b can be ensured.

The vertical shaft 2 has the largest possible diameter so as to have enhanced rigidity and is rotatably positioned substantially centrally of the cabinet H by the aforementioned vertical shaft lower bearing 19 and the upper and lower taper roller bearings 23 and 24. The vertical shaft 2 is fixedly attached with the worm wheel 17 at a portion accommodated in the gear chamber 20, i.e., a portion adjacent the lower end of the vertical shaft 2 and with a lower clutch plate 25 as a joint mechanism at an upper end portion thereof.

The rotary table 3 comprises a lower rotary table portion 3a and an upper rotary table portion 3b. The lower rotary table portion 3a is configured to hold the lower punches 6 for sliding movement and has a die holding member 3aa for releasably holding dies 4 at a predetermined pitch on the same circumference. On the other hand, the upper rotary table portion 3b is configured to hold the upper punches 6 for sliding movement. The upper rotary table portion 3b includes a center shaft 3*ba* which, when necessary, becomes connected to the vertical shaft 2 via an upper clutch plate 26 serving as a joint mechanism, and a suspension shaft 3*c* attached to an upper end portion of the center shaft 3*ba* via a bearing 3*bb*. The suspension shaft 3*c* is pressed by the lifting mechanism 13 to function as a bearing for the rotary table 3 during operation. When the rotary table 3 is to be detached, the suspension shaft 3 functions as a connector between the lifting mechanism 13 and the rotary table 3.

The lower and upper clutch plates 25 and 26 constituting the joint mechanism are each shaped into a torus having plural teeth oriented toward the axis and arranged at a predetermined pitch, as disclosed in Japanese Patent No. 2992529 of the applicant of the instant application. There is no limitation on the aforementioned joint mechanism as long as it is a claw clutch.

A guide rail 27 mounted on peripheral wall around a lower end portion of the suspension shaft 3*c* guides each upper punch 5 held by the rotary table 3 to the highest position adjacent a powder loading position and then to a lower position just below each upper roll 7. A lowering device 28 disposed under the rotary table 3 moves each lower punch 6 up and down and guides it to the highest position when a molded product resulting from compression with lower roll 8 is to be removed from die 4. With the rotary table 3 in a state detached from the vertical shaft 2, the upper and lower punches 5 and 6 can be removed from the machine together with the rotary table 3, guide rail 27, lowering device 28 and the like.

Each upper roll 7 is slidably mounted to the underside of a crossbeam portion 14*bb* of the upper frame 14*b*. Specifically, the upper roll 7 is rotatably mounted to a mounting shaft 29*a* disposed in a mounting block 29 via bearing 29*b*. Usually, the mounting block 29 is immovably fixed to the upper frame 14*b*. However, when released from the fixed state, the mounting block 29 becomes capable of sliding toward the backside. The bearing 29*b* associated with upper roll 7 is structured so as to prevent air remaining in grease from leaking from inside.

The discharge mechanism 9 includes a suction device 9*a* for sucking out the atmosphere in the cabinet H, an exhaust pipeline 9*b* connected to the suction device 9*a* and opened at specific locations within the cabinet H for exhausting the atmosphere out of the cabinet H, and a connecting pipeline 9*c* provided with a filter 9*ca* and an on-off valve 9*cb* for permitting the exhaust pipeline 9*b* to communicate with the suction device 9*a* when necessary. The suction device 9*a* may be, for example, a vacuum pump located outside the cabinet H, such as an aspirator or a dry-sealed vacuum pump. Raw material powder may be mixed into the atmosphere passing through the connecting pipeline 9*c* from the cabinet H.

The exhaust pipeline 9*b* has an open end in the cabinet H for sucking out the atmosphere in the cabinet H, the open end being a sucking end 9*ba* which is open at, at least, a specific location adjacent the upper surface of the rotary table 3. More specifically, the specific location is above and adjacent an upper surface of the die holding member 3*aa* of the rotary table 3 and corresponds to the timing at which a pair of upper and lower punches 5 and 6 for example is subjected to pressing. In this embodiment, the exhaust pipeline 9*b* is also open below a lower surface of the die holding member 3*aa*. The location of each opening is set to coincide with a location at which a slight amount of powder leaking from each die 4 during compression can reliably be sucked. With the openings thus located, flows of air can be generated on the upper and lower sides of the rotary table 3 thereby enabling suction of leaking powder and cooling of the rotary table 3 at a time. The filter 9*ca* of the connecting pipeline 9*c* is provided for eliminating such powder.

The connecting pipeline 9*c* usually allows the exhaust pipeline 9*b* to communicate with the suction device 9*a* through the filter 9*ca* by opening the on-off valve 9*cb*. The on-off valve 9*ca* is closed temporarily, while the suction device 9*a* is connected to a hopper 10*a* and a second collection container 11*b* which are in an atmospheric pressure condition resulting from switching of cross valves 10*ba* and 11*da* of respective of first and second pressure regulating pipelines 10*b* and 11*d* to be described later from the atmospheric pressure side to the reduced pressure side. That is, if the hopper 10*a* and the second collection container 11*b* in the atmospheric pressure condition, or not in the reduced pressure condition, communicate the inside of the cabinet H through respective cross valves 10*ba* and 11*da* without the on-off valve 9*cb* closed, the internal pressure of the cabinet H would rise. The valve 9*cb* is provided for preventing such a change in the internal pressure of the cabinet H and hence is controlled to become open/closed at the aforementioned timing.

The raw material feeding section 10, the internal pressure of which is kept at atmospheric pressure during take-in of the raw material while being reduced during feeding of the raw material into the cabinet H, includes the hopper 10*a*, the first pressure regulating pipeline 10*b*, and a dispenser 10*c*.

The hopper 10*a* receives and temporarily stores raw material supplied from a large-capacity storage chamber (not shown) disposed thereabove or through a feed pipeline (not shown), while the internal pressure of the hopper 10*a* is kept at atmospheric pressure. The hopper 10*a* has an inlet valve 10*aa* comprising a butterfly valve at an upper portion thereof and an outlet valve 10*ab* comprising a butterfly valve at a lower portion thereof which is capable of communicating with the dispenser 10*c*. The inlet valve 10*aa* and the outlet valve 10*ab* are opened/closed in a controlled manner according to the amounts of raw material stored in the hopper 10*a* and the dispenser 10*c* to be described later. The inlet valve 10*aa* is open while the internal pressure of the hopper 10*a* is kept at atmospheric pressure, whereas it is closed completely while the internal pressure of the hopper 10*a* is reduced. In contrast, the outlet valve 10*aa* is closed while the internal pressure of the hopper 10*a* is kept the atmospheric pressure, whereas it is open while the internal pressure of the hopper 10*a* is reduced.

The first pressure regulating pipeline 10*b* communicates with the hopper 10*a* and selectively with one of the suction device 9*a* and an external space by means of the cross valve 10*ba*. Specifically, the first pressure regulating pipeline 10*b* causes the hopper 10*a* to communicate with the external space so as to equalize the internal pressure of the hopper 10*a* to atmospheric pressure by switching the cross valve 10*ba*. When the cross valve 10*ba* is switched to provide communication between the hopper 10*a* and the suction device 9*a*, the first pressure regulating pipeline 10*b* sucks out the atmosphere inside the hopper 10*a* to reduce the internal pressure of the hopper 10*a*. The first pressure regulating pipeline 10*b* is provided with a raw material collecting filter 10*bb* for preventing raw material sucked out of the hopper 10*a* from scattering outside during the operation for reducing the internal pressure of the hopper 10*a*. Switching of the cross valve 10*ba* is performed in accordance with the fed condition of raw material by a control device not shown.

On the other hand, the dispenser 10*c* has an agitating element 10*ca* at the bottom thereof. When the hopper 10*a* is in the reduced pressure condition, the dispenser 10c communicates with the hopper 10a for raw material to be introduced into the dispenser 10c and feeds a predetermined amount of raw material to the raw material loading section 31 located above the rotary table 3 by rotating the agitating element 10ca. For this purpose, a pressure reduction pipeline 10cc having a filter 10cb connects the dispenser 10c to the suction device 9a via the on-off valve 9cb of the connecting pipeline 9c so that the internal pressure of the dispenser 10c is usually reduced to a pressure substantially equal to the internal pressure of the cabinet H thereby avoiding suction of raw material into the cabinet H due to a pressure difference. Thus, the pressure reduction pipeline 10cc is connected to the connecting pipeline 9c to connect the dispenser 10c to the suction device 9a via the on-off valve 9cb and, hence, an instantaneous change in the internal pressure of the dispenser 10c, which would otherwise be possible for example when the inside of the second collection container 11b is in an atmospheric pressure condition, can be prevented.

The molded product delivery section 11 includes a first collection container 11a for collecting molded products removed from the dies 4 under reduced pressure, the second collection container 11b for delivering molded products taken therein from the first collection container 11a under atmospheric pressure, a valve member 11c for providing communication between the first and second collection containers 11a and 11b by reciprocation when necessary, and the second pressure regulating pipeline 11d for regulating the internal pressure of the second collection container 11b. Specifically, the first collection container 11a is located within the cabinet H so that its upper end portion coincides with a location at which a molded product is removed from each die bore 4a. The first collection container 11a has a door (not shown) at a lower portion thereof, the door being configured to open and close by pivoting about its lower edge. A molded product transport path 11e extends from the first collection container 11a to the second collection container 11b and has a lower end communicating with the inlet of the second collection container 11b.

The second collection container 11b is mounted as protruding from the cabinet H and has an inlet to be opened/closed by the valve member 11c reciprocating horizontally. The second collection container 11b further has an outlet 11f at a lower end portion thereof for allowing molded products to be removed from the machine, the outlet 11f being provided with an outlet valve 11g comprising a butterfly valve for example for substantially opening/closing the outlet 11f.

The second pressure regulating pipeline 11d communicates with the second collection container 11b and selectively with one of the suction device 9a and an external space by means of the cross valve 11da. Specifically, the second pressure regulating pipeline 11d causes the second collection container 11b to communicate with the suction device 9a by switching the cross valve 11da, so as to suck out the internal atmosphere of the second collection container 11b thereby reducing the internal pressure thereof. When the cross valve 11da is switched to provide communication between the second collection container 11d and the external space, the second pressure regulating pipeline 11d equalizes the internal pressure of the second collection container 11b to atmospheric pressure. The second pressure regulating pipeline 11d is provided with a filter 11db for preventing dust flown into the second collection container 11b from the first collection container 11a and powder adhering to molded products collected in the second collection container 11b from scattering outside during the operation for reducing the internal pressure of the second collection container 11b. Like the cross valve 10ba of the first pressure regulating pipeline 10b, the cross valve 11da can be switched in accordance with the collected condition of molded products by a control device not shown.

The open air introducing section 12 includes a flow control valve 12a disposed, for example, in an upper portion of the cabinet H as a control device for controlling the flow rate of open air to be taken in. Normally, the internal pressure of the cabinet H is determined from the rate of suction out by the suction device 9a and the flow rate controlled by the flow control valve 12a. Therefore, the flow control valve 12a is controlled with the rate of suction out kept constant to control the internal pressure of the cabinet H. The flow control valve 12a is controlled either manually or automatically. Though not illustrated, an arrangement provided with a pressure sensor for measuring the internal pressure of the cabinet H may be employed for monitoring the internal pressure of the cabinet H in and out of operation by visually outputting the internal pressure based on an output signal outputted by the pressure sensor. Alternatively, it is possible to employ an arrangement which is capable of automatically controlling the flow control valve 12a so that when the measured pressure based on the output signal from the pressure sensor is higher than a target pressure, the flow control valve 12a is throttled back and that when the measured pressure is lower than the target pressure, the throttle opening of the flow control valve 12a at that time is maintained or the throttle opening is enlarged to have a measured pressure substantially equal to the target pressure.

In the rotary powder compression molding machine thus constructed, glove fitting devices GD are fitted to the cabinet H so as to allow operations to be performed on raw material loading section 31, lower punch removing section 32, upper punch removing and powder leveling section 33 and molded product removing section 34 of the rotary table 3 of the molding machine body PB. Before fitting each of the glove fitting devices GD to the cabinet H, the glove fitting device GD is assembled by a process including: fitting glove G to the tubular container GD1 as fitted with the lid-shaped member LD; putting the fitted glove G in a folded state into the tubular container GD1; and fitting the lid member L to the tubular container L.

The lid-shaped member LD is inserted into the tubular container GD1 with the engagement member SM1 coinciding with the major axis of the lid-shaped member LD and then the fitting portion LD2 is fitted into the opening of the second open end GD12 until the outer peripheral portion LD1 is brought into intimate contact with the collar portion GD16. Thereafter, the pipe member SM21a of the rotation manipulating portion SM2 together with the manipulating member RC3 is gripped so that the manipulating member RC3 comes close to the pipe member SM21a and then rotated through about 90° clockwise until the coupling member SM21b is brought into contact with the second stop pin LD4. When the hand is taken off the manipulating member RC3 upon completion of rotation, the pin RC21a engages the locking hole RC1. By so doing, the engagement member SM1 rotates similarly and then stops in a state engaging the collar portion GD16.

Subsequently, the glove fitting device GD containing the glove G therein is brought into intimate contact with the mounting member H2 mounted on the flat plate member H1 of the cabinet H, with the engaging lugs GD17 of the engagement collar GD14 being positioned close to the respective engaged portions H22. Then, the handle HD of the tubular container GD1 is manipulated to rotate the tubular container GD1 clockwise for example in a slipping manner. When the positioning member GD18 engages the positioning hole H24, the glove fitting device GD becomes fitted to a predetermined fitting position. With the glove fitting device GD in a state fitted to that fitting position, the engaging lugs GD17 are in engagement with the respective engaged portions H22.

With the tubular container GD1 thus fitted with the lid-shaped member LD, the cabinet H becomes hermetically closed when the door or the like is closed. Thus, the rotary powder compression molding machine PM becomes ready to operate. Before use of the glove G, the lid-shaped member L needs to be removed from the tubular container GD1 first. This is because the glove G is contained as folded in the tubular container GD1 fitted with the lid-shaped member LD and hence cannot be stretched.

The lid-shaped member LD can be removed by manipulating the grip portion SM21 with a hand in the glove G. Specifically, first, the grip portion SM21 is gripped to bring the manipulating member RC3 close to the pipe member SM21a. With the pin RC21a of the locking rod member RC2 forming part of the rotation restricting mechanism RC being in a state disengaged from the locking hole RC1, the grip portion SM21 is rotated clockwise until the coupling member SM21b is brought into contact with the first stop pin LD3. This causes the engagement member SM1 forming part of the fixing mechanism SM to rotate to disengage its opposite ends from the collar portion GD16 and assume the position coinciding with the major axis of the lid-shaped member LD (indicated with broken line in FIG. 5).

The lid-shaped member LD kept in that position is temporarily moved into the tubular container GD1 with the grip portion SM21 held with the hand. In turn, the position of the lid-shaped member LD is changed so that the major axis of the lid-shaped member LD becomes perpendicular to the opening of the second open end GD12. That is, the lid-shaped member LD is displaced into a horizontal position with its fitting portion LD2 oriented upward for example, and then the glove G is stretched to put the lid-shaped member LD into the cabinet H from the second open end GD12. The lid-shaped member LD thus put into the cabinet H is placed at a predetermined location within the cabinet H. Once the lid-shaped member LD is thus removed from the tubular container GD1, the glove G can be stretched into the cabinet H, thus allowing necessary operations to be performed on the molding machine body PB. Examples of such operations include adjustment operations on a feed shoe and the like during the operation of the molding machine body PB, and parts replacement operations after the operation of the molding machine body PB has been finished and before cleaning.

Once the use of the glove G is finished, it is sufficient for the glove G to be accommodated into the tubular container GD1 before fitting of the lid-shaped member LD to the tubular container GD1. The fitting of the lid-shaped member LD to the tubular container GD1 is performed as follows. First, the grip portion SM21 of the lid-shaped member LD is gripped with the hand in the glove G and then the lid-shaped member LD is held in the same position as in putting the detached lid-shaped member LD into the cabinet H. Thereafter, the lid-shaped member LD is moved out of the cabinet H into the tubular container GD1 through the opening of the second open end GD12.

In the tubular container GD1 the position of the lid-shaped member LD is changed so that the fitting portion LD in a state oriented downward comes to face the opening of the second open end GD12. Further, the lid-shaped member LD is rotated so that the major axis of the lid-shaped member LD coincides with that of the opening of the second open end GD12. With this state being kept, the lid-shaped member LD is fitted to the second open end GD12. Since the opening of the second open end GD12 and the fitting portion LD2 are both shaped elliptic, the lid-shaped member LD can be positioned by fitting the fitting portion LD2 into the opening of the second open end GD12. Accordingly, the lid-shaped member LD as fitted to the second open end GD12 becomes unable to rotate.

Subsequently, the grip portion SM21 is rotated counterclockwise until stop. The grip portion SM21 becomes stopped at a predetermined position when the coupling member SM21b contacts the second stop pin LD4 and, at the same time, the locking rod member RC2 becomes fitted into the locking hole RC1. Thus, rotation of the grip portion SM21 causes the engagement member SM1 to rotate into the position where the opposite ends of the engagement member SM1 stick out from the lid-shaped member LD along the minor axis of the lid-shaped member LD and engage the collar portion GD16 (depicted with dashed double-dotted line in FIG. 5). Thus, the second open end GD12 is closed with the lid-shaped member LD and, hence, the glove G becomes contained in the tubular container GD1. Thereafter, the lid member L is fitted to the tubular container GD1 to confine the glove G within the tubular container GD1 as isolated from the outside.

The glove fitting device GD can be removed from the cabinet H by rotating the handle H counterclockwise with hand. Since the tubular container GD1 is positioned by means of the positioning member GD18, the engagement between the positioning member GD18 and the positioning hole H24 is released by rotating the glove fitting device GD. When the engaging lugs GD17 are disengaged from the respective engaged portions H22 by further rotating the glove fitting device GD, the glove fitting device GD can be detached from the cabinet H. Since this embodiment fails to use any bolt or the like for fixing the glove fitting device GD, the glove fitting device GD can be fitted to and removed from the cabinet H with ease.

Thus, in the production of molded products from, for example, a raw material having a strong influence on human body, even when the raw material is attached to the glove G, the glove fitting device GD can be removed from the cabinet H for replacement of glove G, with the tubular container GD1 kept hermetically closed. It is therefore possible to protect a transport path for transporting the glove G to a replacement site and the periphery of the transport path from contamination due to scattering of raw material.

In this embodiment, the rotary powder compression molding machine PM operates as follows.

In preparation for the operation of the rotary powder compression molding machine PM, the suction device 9a is initially actuated to reduce the internal pressure of the cabinet H to a reduced pressure which is lower than atmospheric pressure and keep the reduced pressure constant. Specifically, the suction device 9a is actuated before the operation of the machine and the throttle opening of the flow control valve 12a is adjusted to reduce the internal pressure of the cabinet H to a predetermined value. This predetermined value is selected from a range from 66.6 HPa (50 Torr) to 133.3 HPa (100 Torr) for example. Preferably, the predetermined value is as low as possible within this range. After actuation, the suction device 9a is allowed to operate continuously with constant performance, or without varying the rate of suction, as described earlier.

When the suction device 9a is thus actuated, the atmosphere within the cabinet H is discharged to the outside through the exhaust pipeline 9b, while open air is introduced into the cabinet H through the flow control valve 12a. Accordingly, the internal pressure of the cabinet H lowers by throttling back the flow control valve 12a, or reducing the rate of introduction of open air. Conversely, the internal pressure of the cabinet H rises by enlarging the throttle opening of the flow control valve 12a, or increasing the rate of introduction of open air. After starting of actuation, the suction device 9a is allowed to operate continuously to maintain the inside of the cabinet H in the reduced pressure condition. When the internal pressure of the cabinet H reaches the predetermined pressure which is lower than atmospheric pressure, the machine becomes ready to compress the raw material.

Subsequently, the raw material is introduced into the hopper 10a. At this occasion, the hopper 10a is controlled so that the internal pressure thereof becomes substantially equal to atmospheric pressure by operating the cross valve 10ba of the first pressure regulating pipeline 10b with the inlet valve 10aa and outlet valve 10ab closed. At the time when the internal pressure of the hopper 10a becomes substantially equal to atmospheric pressure, the inlet valve 10aa is opened to cause raw material to be introduced into the hopper 10a. When the amount of raw material introduced into the hopper 10a reaches a predetermined value, the internal pressure of the hopper 10a is reduced by closing the inlet valve 10aa and switching the cross valve 10ba. At the time when the internal pressure of the hopper 10a becomes substantially equal to that of the cabinet H, the outlet valve 10ab of the hopper 10a is opened to cause raw material in the hopper 10a to be introduced into the dispenser 10c.

In this way, raw material is introduced into the hopper 10a with the internal pressure thereof substantially equalized to atmospheric pressure and then raw material is paid out to the dispenser 10c with the internal pressure of the hopper 10a substantially equalized to the reduced internal pressure of the cabinet H. Therefore, the internal pressure of the hopper 10a does not become higher than that of the cabinet H in substantial feeding of raw material into the cabinet H. That is, there arises no pressure difference between the hopper 10a and the cabinet H in feeding raw material. For this reason, it is possible to prevent raw material from abruptly traveling from the hopper 10a into the cabinet H, thereby to prevent diffusion of raw material within the cabinet H reliably. Further, the internal pressure of the cabinet H can be prevented from rising abruptly.

Since raw material is fed or paid out to the dispenser 10c with the internal pressure of the hopper 10a kept at a reduced pressure, the amount of air mixed in raw material loaded in the dispenser 10 can be reduced. Therefore, in compression-molding raw material loaded in each die 4, it is possible to minimize the occurrence of spouting of raw material out of the die 4 due to air mixed in raw material. Such a reduced amount of air mixed in raw material allows resulting molded products to have at least a substantially constant hardness, which can contribute to an improvement in the quality of molded products.

When the rotary table 3 is rotated after the state capable of feeding raw material to dies 4 has been assumed, raw material is loaded into the die bore 4a of each die 4 with the tip end of lower punch 6 inserted therein and then the tip end of upper punch 5 is inserted into the die bore 4a. With this state being maintained, the pair of upper and lower punches 5 and 6 passes through between the pair of upper and lower rolls 7 and 8, thereby compression-molding the raw material loaded in the die bore 4. The compression molding operation performed in this embodiment is the same as the well-known compression molding operation under atmospheric pressure except that it is performed under reduced pressure.

Though the amount of air mixed in raw material is reduced by reducing the internal pressure of the hopper 10a prior to the feeding of raw material to the dispenser 10c, a small amount of air remains in raw material. Such residual air may cause raw material to spout from each die 4 in the compression molding operation. Since this embodiment includes the exhaust pipeline 9b having sucking ends 9ba which are open at respective locations adjacent the upper and lower surfaces of the rotary table 3, a very small amount of raw material leaking out of die 4 is discharged to the outside. Accordingly, it is possible to prevent a portion of raw material that has leaked out of die 4 during compression molding from scattering within the cabinet H.

At that time, the exhaust pipeline 9b sucks atmosphere present around the rotary table 3 in order to suck the leaking portion of raw material. As a result, heat around the rotary table 3 resulting from heating of such atmosphere by the rotary table 3 is sucked and discharged, whereby the rotary table 3 generating heat can be cooled. That is, as compression molding proceeds, friction occurs between each die 4 and the tip ends of respective upper and lower punches 5 and 6 to raise the temperature of the whole rotary table 3. Since the heat transfer rate is lowered in a reduced pressure condition, generated heat is easy to remain in the rotary table 3. The sucking ends 9ba of the exhaust pipeline 9b, which are open at the locations adjacent the upper and lower surfaces of the rotary table 3, generate air flow at those locations. Thus, heat generated at the rotary table 3 is transferred to the air flow and then discharged to the outside, so that the rotary table 3 is cooled. Therefore, fluctuations in the dimensions of die 4 and upper and lower punches 5 and 6 can be minimized. This makes it possible to eliminate a problem that resulting compression-molded products have inconstant hardness due to unstable molding pressure resulting from fluctuations in the dimensions of those components.

Molded products obtained from compression molding under reduced pressure are collected in the first collection container 11a. The door (not shown) of the first collection container 11a is closed usually, but opened to pay out molded products collected in the first collection container 11a to the second collection container 11b when the internal pressure of the second collection container 11b is reduced. That is, the molded products collected in the first collection container 11a are transferred to the second collection container 11b when the internal pressure of the second collection container 11b is reduced.

In a hermetic state with the valve member 11c and outlet valve 11g closed, the second collection container 11b is caused to communicate with the suction device 9a by operating the cross valve 11da of the second pressure regulating pipeline 11d, so that the internal pressure of the second collection container 11b is reduced as the atmosphere within the container 11b is sucked out. When the internal pressure of the second collection container 11b is thus reduced, the internal pressures of the respective first and second collection containers 11a and 11b reach equilibrium. Accordingly, molded products do not move back toward the cabinet H against the stream when the valve member 11c of the second collection container 11b is opened. Further, even when the valve member 11c is opened, open air fails to flow into the cabinet H through the second collection container 11$b$ and, hence, the internal pressure of the cabinet H does not vary. Therefore, compression molding can continue under stabilized reduced pressure.

The molded products collected in the second collection container 11$b$ can be removed by opening the outlet valve 11$g$ when the internal pressure of the second collection container 11$b$ is made substantially equal to atmospheric pressure by switching the cross valve 11$da$ of the second pressure regulating pipeline 11$d$ with both of the valve member 11$c$ and the outlet valve 11$g$ closed. Since the molded products are paid out from the second collection container 11$b$ of which the internal pressure is made equal to atmospheric pressure, the molded products can easily be removed and collected from the second collection container 11$b$. Even in this case, the internal pressure of the cabinet H can be prevented from varying because the second collection container 11$b$ and the cabinet H are made independent of each other by the valve member 11$c$ closed.

Further, since the valve member 11$c$ located at the inlet 11$ba$ of the second collection container 11$b$ opens and closes the inlet 11$ba$ by reciprocation, even if raw material powder falls down to the second collection container 11$b$ from the first collection container 11$a$, the operation of the valve member 11$c$ will not be hindered with such raw material powder. Thus, the second collection container 11$b$ can collect and pay out molded products reliably even when its internal condition changes between the reduced pressure condition and the atmospheric pressure condition.

The present invention is not limited to the foregoing embodiment. The feature or structure of each part of the invention is not limited to the embodiment illustrated in the drawings, but may be modified variously without departing from the scope and concept of the present invention. For example, the glove fitting device GD according to the present invention may be applied not only to a compression molding machine having molding machine body PB housed in cabinet H as in the foregoing embodiment but also to a so-called glove box housing different processing devices for use in nuclear energy facilities.

As described above, the present invention can advantageously be applied to apparatus or equipment which has a cabinet to be hermetically closed to define therein a space isolated from ambient atmosphere and which requires manual operations through the cabinet from the outside, such as a glove box.

What is claimed is:

1. A glove fitting device for fitting a glove to a hermetically sealable cabinet in a manner to allow the glove to be stretched into the cabinet, the glove fitting device in combination with the cabinet, comprising:
   a tubular container having opposite first and second open ends, the first open end being configured to allow the glove to be replaceably fitted thereto;
   a lid-shaped member to be removably fitted to the second open end of the tubular container from inside of the tubular container to close the opening of the second open end substantially hermetically, the second open end becoming oriented inwardly of the cabinet when the tubular container is fitted to the cabinet; and
   a fixing mechanism for fixing the lid-shaped member to the second open end, wherein
   the glove fitting device is removably fitted to the cabinet, wherein the second open end has an internal dimension larger than a smallest external dimension of the lid-shaped member, and
   wherein an internal pressure of the cabinet is lower than an atmospheric pressure.

2. The glove fitting device according to claim 1, wherein the opening of the second open end is defined by an inner periphery of a collar portion having an annular flat surface and protruding inwardly of the tubular container, while the lid-shaped member comprises an outer peripheral portion to overlap the annular flat surface of the collar portion, and a fitting portion to be fitted into the opening of the second open end.

3. The glove fitting device according to claim 1, wherein the fixing mechanism is mounted to the lid-shaped member and comprises an engagement member capable of rotating to engage the tubular container, and a rotation manipulating portion for rotating the engagement member when manipulated.

4. The glove fitting device according to claim 2, wherein the fixing mechanism is mounted to the lid-shaped member and comprises an engagement member capable of rotating to engage the tubular container, and a rotation manipulating portion for rotating the engagement member when manipulated.

5. The glove fitting device according to claim 3, wherein the engagement member is a rod member disposed on one side of the lid-shaped member for engaging a peripheral portion around the opening of the second open end of the tubular container, while the rotation manipulating portion comprises a grip portion disposed on an opposite side of the lid-shaped member, and a rotating shaft interconnecting the grip portion and the rod member.

6. The glove fitting device according to claim 4, wherein the engagement member is a rod member disposed on one side of the lid-shaped member for engaging a peripheral portion around the opening of the second open end of the tubular container, while the rotation manipulating portion comprises a grip portion disposed on an opposite side of the lid-shaped member, and a rotating shaft interconnecting the grip portion and the rod member.

7. The glove fining device according to claim 5, further comprising a rotation restricting mechanism disposed between the grip portion and the lid-shaped member for stopping the rod member at a predetermined position.

8. The glove fining device according to claim 6, further comprising a rotation restricting mechanism disposed between the grip portion and the lid-shaped member for stopping the rod member at a predetermined position.

9. The glove fining device according to claim 1, wherein the second open end has an internal dimension larger than a smallest external dimension of the lid-shaped member.

10. The glove fining device according to claim 2, wherein the second open end has an internal dimension larger than a smallest external dimension of the lid-shaped member.

11. The glove fining device according to claim 1, wherein the opening of the second open end is elliptic.

12. The glove fining device according to claim 2, wherein the opening of the second open end is elliptic.

13. The glove fitting device according to claim 1, wherein the tubular container has an external surface formed with an engagement collar to be engaged with the cabinet for fitting the tubular container to the cabinet.

14. The glove fitting device according to claim 2, wherein the tubular container has an external surface formed with an engagement collar to be engaged with the cabinet for fining the tubular container to the cabinet.

15. The glove fining device according to claim 1, further comprising a lid member to be removably fitted to the tubular container for closing the opening of the first open end of the tubular container.

16. The glove fitting device according to claim 2, further comprising a lid member to be removably fitted to the tubular container for closing the opening of the first open end of the tubular container.

17. The glove fitting device according to claim 1, wherein the cabinet houses a rotary powder compression molding machine body therein.

18. The glove fitting device according to claim 2, wherein the cabinet houses a rotary powder compression molding machine body therein.

* * * * *